United States Patent Office 3,294,499
Patented Dec. 27, 1966

3,294,499
STABILIZED HYDROCARBON COMPOSITIONS
James H. T. Brook, Birkenhead, England, and Roy L. Allen, Gresford, near Wrexham, Wales, assignors to Shell Oil Company, New York, N.Y., a corporation of Delaware
No Drawing. Filed Aug. 26, 1963, Ser. No. 304,665
Claims priority, application Great Britain, Sept. 11, 1962, 34,669/62
28 Claims. (Cl. 44—63)

This application is a continuation-in-part of copending application Ser. No. 252,031, filed Jan. 17, 1963, now abandoned.

This invention relates to liquid hydrocarbon fuels and in particular to distillate fuel oils, and is especially concerned with distillate fuel oils comprising thermally or catalytically cracked products. By distillate fuel oil is meant a mineral oil fraction of which at least 98% volume can be distilled at a temperature not greater than 400° C. at atmospheric pressure, and which has an ash content of not more than 0.01% by weight. It is an object of this invention to improve the stability of such fuel oils, i.e., to reduce their tendency to sludge deposition on storage for long periods.

According to the present invention a fuel oil composition comprises a distillate fuel oil consisting of up to 90% of a distillate fraction of a crude oil and 10% or more of a thermally or catalytically cracked product, and a small amount of (1) an oil-soluble organic epoxide and (2) an oil-soluble basic substance having a boiling point of not less than 190° F.

Epoxides suitable for the purpose of this invention are of the general formula:

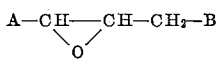

wherein A is selected from the group consisting of hydrogen and $C_{1-30}$ alkyl and B is selected from the group consisting of —$R_1$, —$OR_2$,

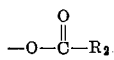

and —$(OR_3)_n$, wherein $R_1$ is $C_{5-18}$ alkyl, $R_2$ is selected from the group consisting of aryl and alkaryl having from 6 to 40 carbon atoms per molecule, cycloalkyl having from 10 to 40 carbon atoms per molecule, and alkyl having from 1 to 18 carbon atoms per molecule, $R_3$ is phenyl having no more than 3 alkyl substituents, said alkyl substituents having no more than 2 carbon atoms per molecule, and $n$ is a whole number from 3 to 8.

The preferred organic epoxides are epoxy hydrocarbons, epoxy ethers or epoxy polyethers, and epoxy esters. Preferred epoxy hydrocarbons are 1,2-epoxyhexane and 1,2-epoxydodecane. These compounds are readily made by the reaction of a suitable 1-olefin with a peracid such as peracetic acid, or with hypochlorous acid followed by alkali. When in the above formula B is the group —$OR_2$ having the configuration —O·$C_6H_4R'$, wherein R' is hydrogen or alkyl, suitable epoxy ethers are phenyl glycidyl ether or octyl phenyl glycidyl ether. These may be prepared by reaction of the phenol with epichlorohydrin in the presence of a large excess of alkali. Epoxy esters corresponding to the above formula when A is hydrogen are prepared by the reaction of epichlorohydrin with a suitable carboxylic acid. Such an acid may be a fatty acid of 1 to 18 carbon atoms, a naphthenic acid of 10 to 40 carbon atoms, or, more particularly, an acid made by the reaction of an olefin with carbon monoxide and water in the presence of a catalyst such as boron trifluoride. The product of this reaction is a mixture of carboxylic acids, the molecular weights of which depend upon the number of carbon atoms in the olefin starting material. Acids made by this process are predominantly tertiary carboxylic acids of the general formula R·R'·R''·C·COOH. These epoxides are effective in concentrations from 0.1 to 50 millimoles per liter, more preferred concentrations being from 0.5 to 20 millimoles per liter of fuel.

The oil-soluble basic substance may be an organic base, or a basic substance containing an inorganic basic constituent (hereinafter included under the term inorganic base or, with organic bases, under the term base). Suitable organic bases include primary, secondary or tertiary aliphatic or aromatic amines and heterocyclic organic nitrogen compounds in which a single nitrogen atom is part of a six-membered ring. Such materials include pyridine, piperidine and benzologs thereof such as quinoline, each of which may contain alkyl substituents on the ring(s) thereof. It is preferred as to each of the foregoing three classes of organic bases (i.e., aliphatic amines, aromatic amines and heterocyclic nitrogen compounds) that the total number of carbon atoms in the molecule should be not less than 5 and not greater than 18. Tertiary amines are preferred, and tertiary aliphatic amines are especially preferred.

When the base is inorganic it may be a hydroxide, oxide or carbonate of a metal of Groups I or II of the Periodic Table (after Mendeleeff), or ammonium. The inorganic base must be present in oil-soluble form, and this can be accomplished conveniently by incorporating the base into the fuel in the form of the so-called basic and superbasic salts. The term "basic salt" or "superbasic salt" as used herein refers to metal salts of oil-soluble organic acids containing an amount of metal in excess of that theoretically required to replace the acidic hydrogen atoms of the acid. Compounds of this type have long been used as components of lubricant compositions.

Such "basic salts" which are useful in accordance with the invention are salts of Groups I and II metals having atomic numbers of from 12 through 56 or ammonium and organic acids. The term "organic acid" as used herein also includes phenols. Thus the salts employed may be salts of carboxylic, thiocarboxylic, sulfonic, sulfamic, sulfinic, thiosulfonic, phosphoric or thiophosphinic acids, phenols, or partial esters of sulfuric acid or of phosphorus oxyacids or of thio acids.

The carboxylic acids, the salts of which can be employed, include the fatty acids having at least twelve carbon atoms, for example palmitic, stearic, myristic, oleic and linoleic acids, the substituted fatty acids, such as the hydroxystearic acids, the chlorostearic acids and the nitrolauric acids, the aromatic carboxylic acids, such as those containing a benzene or naphthalene ring and an oil-solubilizing radical, such as the stearylbenzoic acids, benzoic or naphthoic acids substituted by a long hydrocarbon chain derived from paraffin wax, and particularly the alkyl salicylic acids, and the cycloaliphatic carboxylic acids, such as the petroleum naphthenic acids, the cetyl cyclohexane carboxylic acids, the dilauryl decahydronaphthalene carboxylic acids and the dioctylcyclopentane carboxylic acids.

The sulfonic acids, the salts of which can be employed, include the aliphatic-substituted cyclic sulfonic acids, preferably those in which the aliphatic substituent or substituents contain a total of at least twelve carbon atoms, for example, the alkylaryl sulfonic acids, the alkylcycloaliphatic sulfonic acids, and the alkyl-heterocyclic sulfonic acids, and the aliphatic sulfonic acids in which the aliphatic radical preferably contains at least twelve carbon atoms. Specific examples of such sulfonic acids are the petroleum sulfonic acids, the sulfonic acids of naphthalene or benzene substituted by long hydrocarbon chains derived from paraffin wax, the dodecylbenzene sulfonic acids, the cetylchlorobenzene sulfonic acids, the cetylphenol sulfonic acids, the octylphenol disulfide sulfonic acids, the cetylphenol monosulfide sulfonic acids, the cetoxy caprylbenzene sulfonic acids, the dilauryl-beta-naphthol sulfonic acids, the dicaprylnitronaphthalene sulfonic acids, the alkyl sulfonic acids derived from paraffin wax, the tetraisobutylene sulfonic acids, the tetraamylene sulfonic acids, the petroleum naphthene sulfonic acids, the cetyl cyclopentyl sulfonic acids, the lauryl cyclohexyl sulfonic acids and the bis-(diisobutyl)-cyclohexyl sulfonic acids.

The phenols, the salts of which may be used, include the octylphenols, dodecylphenols, octadecylphenols, diisopropylphenols, dihexylphenols and the condensation products of phenols with aldehydes or ketones such as the condensation products of octylphenol and formaldehyde.

The partial esters of phosphorus oxyacids or thioacids, the salts of which may be used, include the aliphatic, cycloaliphatic and aromatic partial esters of phosphorus, phosphoric, thiophosphoric and thiophosphorous acids, such as dicapryl dithiophosphoric acid, di(methylcyclohexyl) dithiophosphoric acid, dilauryl dithiophosphoric acid, dicapryl dithiophosphorous acid, di(methylcyclohexyl)dithiophosphorous acid, lauryl monothiophosphoric acid and di(butylphenyl) dithiophosphoric acid.

Alkaline earth metal salts are particularly preferred, examples of which are the higher basic alkaline earth metal naphthenates, the preparation of which is described in, for example, U.K. specification 795,657 and U.S. 2,865,956; basic alkaline earth metal petroleum sulfonates as described in U.S. 2,794,829 and U.K. specification 790,471; basic alkaline earth metal salts of alkyl salicylates, prepared, for example, according to U.K. specification 734,598; and alkaline earth metal salts of an alkyl phenol/formaldehyde condensation product as described, for example, in U.K. specification 586,461. The base, whether organic or inorganic, is effective in concentrations from 0.1 to 50 millimoles per liter of fuel and may be equivalent, approximately, to the concentration of epoxide in the fuel. Preferred concentrations of base are from 0.5 to 20 millimoles per liter of fuel.

When the inorganic organic basic constituent contains a Group IIB metal, it is preferred also to use at least 0.1 millimole of organic base per liter of fuel and, still further, preferably at least 0.5 millimole per liter. In this case, the total concentration of organic bases should be from about 0.2 (preferably 1.0) to 50 (preferably 20) millimoles per liter of fuel.

The additives of the present invention are particularly advantageous in fuels which also contain phenolic antioxidants. Such antioxidants may have themselves a sludge-inhibiting effect with which the effect of the present additives is synergistic. Examples of suitable phenolic antioxidants are 2,6-ditertiary butyl-4-methyl phenol, bis-(3,5-ditertiary butyl-4-hydroxyphenyl)methane, bis(3,5-ditertiary butyl-2-hydroxyphenyl)sulfide, bis(5-methyl-3-tertiary butyl-2-hydroxyphenyl)sulfide, the barium salt of bis(p-tertiary amyl phenol)disulfide, and calcium alkyl salicylate. The antioxidants are effective in concentrations from 0.1 to 50 millimoles per liter, more preferred concentrations being from 0.5 to 20 millimoles per liter of fuel.

In connection with these phenolic antioxidants, it is not essential that three different additives be used; more than one of the desired functions may be incorporated by means of a single additive. Examples of dual purpose additives, which confer the functions of basicity and antioxidant activity, are the basic calcium salt of an alkyl salicylic acid and the calcium salt of an alkylphenol/formaldehyde condensation product.

The invention is particularly applicable to blended distillate fuels comprising thermally or catalytically cracked products since such fuel blends have proved to be exceptionally prone to sludge or sediment deposition which may block the filters or orifices of equipment used to burn the fuel. It appears that minor constituents of the various components of the blend interact with each other to produce an amount of sludge much greater than would be expected from the sludging tendencies of each component taken separately, an example of such a distillate fuel blend is a diesel fuel oil blend comprising 50% of a straight run distillate and 50% of a catalytically cracked product. However, it is to be understood that 100% catalytic cracking products are not to be excluded, since, as will be shown hereinafter, reduction of sludge deposition in these products is also achieved by the additives of the present invention. All these products contain sulfur compounds, often in the form of mercaptans, together with various olefinic and aromatic compounds.

The following are examples of fuels, in accordance with this invention, which have been made and tested to illustrate the combined effect of organic epoxides and bases.

*Example I*

Equal parts by volume of a light catalytically cracked cycle oil (LCCCO) and a light straight run gas oil (LSRGO), having a mercaptan content of 376 parts per million measured as sulfur and 116 parts per million total nitrogen, and containing 1,2-epoxydodecane at a concentration of 10 millimoles per liter and triethylamine at a concentration of 1 millimole per liter of fuel.

*Example II*

LCCCO having a mercaptan content of 538 parts per million measured as sulfur and 129 parts per million total nitrogen, and containing both the additives of Example I each at a concentration of 10 millimoles per liter of fuel.

*Example III*

LCCCO having a mercaptan content of 528 parts per million measured as sulfur and 144 parts per million total nitrogen, and containing 1,2-epoxydodecane and tributylamine, each at a concentration of 10 millimoles per liter of fuel.

*Example IV*

Base fuel of Example III containing a glycidyl ester of $C_9$–$C_{11}$ tertiary carboxylic acids and tributylamine, each at a concentration of 10 millimoles per liter of fuel.

*Example V*

Base fuel of Examples III and IV containing butyl glycidyl ether and tributylamine, each at a concentration of 10 millimoles per liter of fuel.

*Example VI*

Equal parts by volume of a medium straight run gas oil (MSRGO) and LCCGO containing 1,2-epoxydodecane and tributylamine, each at a concentration of 10 millimoles per liter, and zinc naphthenate at a concentration of 1 millimole per liter of feed.

Preferred compositions of fuel oils according to this invention are those which contain additionally a minor proportion of an antioxidant. The following are examples of fuels which have been made and tested to illustrate the advantages of these preferred compositions.

*Example VII*

Composition of Example I containing additionally 2,6-ditertiary butyl-4-methyl phenol at a concentration of 1 millimole per liter of fuel.

*Example VIII*

Composition of Example II containing additionally 2,6-ditertiary butyl-4-methyl phenol at a concentration of 10 millimoles per liter of fuel.

*Example IX*

LCCCO having a mercaptan content of 538 parts per million measured as sulfur and 129 parts per million total nitrogen, containing 1,2-epoxydodecane and the calcium salt of octyl phenol/formaldehyde resin, each at a concentration of 10 millimoles per liter of fuel.

*Example X*

Base fuel of Example IX containing 1,2-epoxydodecane at a concentration of 10 millimoles per liter and the calcium salt of octyl phenol/formaldehyde resin at a concentration of 1 millimole per liter of fuel.

*Example XI*

Base fuel of Example I containing 1,2-epoxydodecane and the calcium salt of octyl phenol/formaldehyde resin, each at a concentration of 10 millimoles per liter of fuel.

*Example XII*

Base fuel of Example I containing 1,2-epoxydodecane and the basic calcium salt of $C_{14-18}$ salicylic acid, each at a concentration of 10 millimoles per liter of fuel.

*Example XIII*

LCCCO having a mercaptan content of 384 parts per million measured as sulfur, containing 1,2-epoxydodecane and the basic calcium salt of $C_{14-18}$ salicylic acid, each at a concentration of 10 millimoles per liter of fuel. Upon diluting the base fuel of this example, by the method described hereinafter, a very high amount of sludge is precipitated (81.6 milligrams per 100 milliliters of fuel).

*Example XIV*

Base fuel of Example XIII containing 1,2-epoxyhexane and the basic calcium salt of $C_{14-18}$ salicylic acid, each at a concentration of 10 millimoles per liter of fuel.

*Example XV*

Base fuel of Example XIII containing phenyl glycidyl ether and the basic calcium salt of $C_{14-18}$ salicylic acid, each at a concentration of 10 millimoles per liter of fuel.

*Example XVI*

Base fuel of Example XIII containing 1,2-epoxyhexane and the calcium salt of octyl phenol/formaldehyde, each at a concentration of 10 millimoles per liter of fuel.

*Example XVII*

Equal part by volume of a LSRGO and a hydrodesulfurized gas oil, and 10 parts of a LCCCO, having a mercaptan content of 60 parts per million measured as sulfur and 45 parts per million total nitrogen, and containing the glycidyl ester of $C_9$–$C_{11}$ tertiary carboxylic acid at a concentration of 5 millimoles per liter and the calcium salt of octyl phenol/formaldehyde resin, at a concentration of 1 millimole per liter of fuel.

It is to be noted that in Examples IX–XVII the basic and antioxidant functions are incorporated in a single additive.

The improved quality of these fuels can be assessed by determining the amount of sludge developed in the fuel after it has been stored in cans under natural conditions for a known period. The fuel is filtered through a special paper having a controlled pore size of 0.45 micron, and the sludge is washed with light petroleum naphtha (60-80°C. B.P.).

The paper and sludge is then dried at 103° C. for one hour, cooled and weighed. The weight of the paper filter, previously determined after drying for one hour at 103° C., is deducted to obtain the weight of the suspended sludge in the fuel. Sludge adhering to the can is dissolved in ethanol, the solvent is removed by evaporation, the sludge is dried at 103° C. and weighed. These quantities are then summed to give the amount of developed sludge in milligrams per 100 milliliters of fuel. In addition to this sludge, a further quantity can be precipitated by diluting the filtered fuel with 10 parts by volume of light petroleum naphtha (30-40° C. B.P.). This is then allowed to stand overnight and is then determined in the same way as the suspended sludge. This additional sludge has a chemical composition similar to that of the suspended sludge, and may be either the precursor of the fully formed sludge, or a fully formed sludge which remains dissolved in the fuel only because of the aromaticity of the fuel. When the aromaticity is decreased by dilution with a paraffinic solvent the sludge precipitates.

In the following tables, which further illustrate the present invention, the sludging tendency of the fuel is taken as the sum of the three types of sludge hereinbefore described.

Table 1 shows the results when the fuels of Examples I–V, and the base fuels of these Examples, were stored for different known periods at a temperature of 80° F. and then examined, after storage by the filtration and ethanol procedure previously described. The results of the tests are expressed as a percentage of the control, i.e., fuel without additive.

TABLE 1

| Example | Storage Period | | |
|---|---|---|---|
| | 3 months | 6 months | 9 months |
| Fuels of examples without additives—control | 100 | 100 | 100 |
| Example I | | 67 | |
| Example II | 37 | 40 | |
| Example III | 27 | | |
| Example IV | 50 | | |
| Example V | 35 | | |
| Example VI | | 10.6 | 12.7 |

The above table clearly illustrates the combined effect of epoxides and bases as additives for reducing sludge deposition in fuels of the present invention. Example VI shows the excellent results achieved when both an organic base and an inorganic base constituent are employed in the compositions of the invention.

As hereinbefore stated, preferred fuel compositions are those which contain additionally a minor proportion of an antioxidant. Table 2 shows the results of tests carried out on the fuels of Examples VII–XVII, and on the base fuels used in these examples; the results are expressed as a percentage of the control, i.e., fuel without additive. The fuels and the fuels blended with the additives were stored for different known periods at a temperature of 80° F. and then tested for sludge deposition by the described methods.

The effectiveness of the additives of the invention can be seen from the results in Table 2.

Table 3 shows a comparison between fuels containing an epoxide and a base (Examples I and II), and the same fuel blends containing additionally a phenolic antioxidant (Examples VII and VIII respectively). The table clearly illustrates the advantages of fuels containing all three additives of the invention. Results are expressed again as a percentage of the control.

TABLE 2

| Example | Storage Period | | |
|---|---|---|---|
| | 3 months | 4 months | 6 months |
| Fuels of examples without additives—control | 100 | 100 | 100 |
| Example VII | | | 36 |
| Example VIII | 24 | | 29 |
| Example IX | 34 | | |
| Example X | 3 | | |
| Example XI | 20 | | |
| Example XII | 18 | | |
| Example XIII | | 5 | |
| Example XIV | | 3 | |
| Example XV | | 3 | |
| Example XVI | | 1 | |
| Example XVII | 31 | | |

TABLE 3

| Example | Storage Period | |
| --- | --- | --- |
| | 3 months | 6 months |
| Base fuels of Examples without additives—control | 100 | 100 |
| Example I | | 67 |
| Example VII | | 36 |
| Example II | 37 | 40 |
| Example VIII | 24 | 29 |

Other agents for the purpose of enhancing other qualities of the fuel, without detracting from its storage stability, may be added. Such agents may include pour point depressors, e.g., the condensation product of a chlorinated wax, phenol and phthalyl chloride; viscosity index improvers, e.g., polyisobutylene; cetane number improvers, e.g., cyclohexyl nitrate; corrosion inhibitors, e.g., a condensation product of an olefin and maleic anhydride; and other oxidation inhibitors, e.g., phenyl alpha naphthylamine.

We claim as our invention:

1. A distillate fuel composition consisting essentially of (a) petroleum derived hydrocarbons, at least 10% of which are normally liquid hydrocarbons produced from the cracking of petroleum hydrocarbons, (b) from 0.1 to 50 millimoles per liter of said composition of an oil-soluble organic epoxide corresponding to the formula

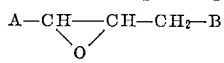

wherein A is selected from the group consisting of hydrogen and $C_{1-30}$ alkyl and B is selected from the group consisting of $-R_1$, $-OR_2$,

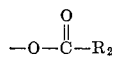

and $-(OR_3)_n$, wherein $R_1$ is $C_{5-18}$ alkyl, $R_2$ is selected from the group consisting of aryl and alkaryl having from 6 to 40 carbon atoms per molecule, cycloalkyl having from 10 to 40 carbon atoms per molecule, and alkyl having from 1 to 18 carbon atoms per molecule, $R_3$ is phenyl having no more than 3 alkyl substitutents, said alkyl substituents having no more than 2 carbon atoms per molecule, and $n$ is a whole number from 3 to 8 and (c) from 0.1 to 50 millimoles per liter of said composition of oil-soluble basic substance having a boiling point of not less than 190° F. selected from the group consisting of organic nitrogen base compounds and inorganic base compounds, the cations of which are selected from the group consisting of metals of Groups I and II having an atomic number of 12 through 56 and ammonium.

2. The composition of claim 1 in which the basic substance is an organic nitrogen base compound selected from the group consisting of hydrocarbon amines and heterocyclic nitrogen compounds in which a single nitrogen atom is part of six-membered ring.

3. The composition of claim 1 in which the basic substance is a heterocyclic nitrogen compound selected from the group consisting of pyridine, piperidine, and benzologs thereof, having no more than 18 carbon atoms per molecule.

4. The composition of claim 1 in which the basic substance is an aliphatic amine having from 5 to 18 carbon atoms per molecule.

5. The composition of claim 4 in which the amine is a tertiary aliphatic amine.

6. The composition of claim 1 in which the basic substance is an oil-soluble form of an inorganic base selected from the group consisting of hydroxides, oxides, and carbonates of the group consisting of Group I and II metals having atomic numbers of from 12 through 56 and ammonium.

7. The composition of claim 6 in which the basic substance is incorporated into the fuel in the form of a basic salt.

8. The composition of claim 7 in which the basic salt is a salt of an organic acid selected from the group consisting of carboxylic, thiocarboxylic, sulfonic, sulfamic, sulfinic, thiosulfonic, phosphonic, thiophosphonic acids, phenol, and partially esterified sulfuric acid, phosphorous oxyacids and thio acids.

9. The composition of claim 7 in which the basic salt is a basic calcium salt of an alkyl salicylic acid.

10. The composition of claim 7 in which the basic salt is the calcium salt of $C_{14-18}$ alkyl-substituted salicylic acid.

11. The composition of claim 7 in which the basic salt is a calcium salt of an alkyl phenol/formaldehyde condensation product.

12. The composition of claim 7 in which the basic salt is the calcium salt of octyl phenol/formaldehyde resin.

13. The composition of claim 1 in which the epoxide is an epoxyhydrocarbon.

14. The composition of claim 13 in which the epoxide is 1,2-epoxyhexane.

15. The composition of claim 13 in which the epoxide is 1,2-epoxydodecane.

16. The composition of claim 7 in which the epoxide is an epoxy ether.

17. The composition of claim 16 in which the epoxide is a glycidyl ether.

18. The composition of claim 16 in which the epoxide is phenyl glycidyl ether.

19. The composition of claim 16 in which the epoxide is octyl phenyl glycidyl ether.

20. The composition of claim 16 in which the epoxide is butyl glycidyl ether.

21. The composition of claim 7 in which the epoxide is an epoxy ester of a $C_{1-18}$ carboxylic acid and epichlorohydrin.

22. The composition of claim 20 in which the epoxide is an epoxy ester of a $C_{6-40}$ tertiary carboxylic acid corresponding to the formula

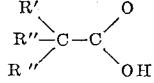

in which the R groups are independently selected alkyl radicals, and epichlorohydrin.

23. The composition of claim 20 in which the epoxy ester is an ester $C_{9-11}$ tertiary carboxylic acids and epichlorohydrin.

24. The composition of claim 1 in which the epoxide is present at a concentration of from 0.5 to 20 millimoles per liter of said composition.

25. The composition of claim 1 in which the oil-soluble basic substance is present at a concentration of from 0.5 to 20 millimoles per liter of said composition.

26. A distillate fuel composition consisting essentially of (a) petroleum derived hydrocarbons, at least 10% of which are normally liquid hydrocarbons produced from the cracking of petroleum hydrocarbons, (b) from 0.1 to 50 millimoles per liter of said composition of an oil-soluble organic epoxide corresponding to the formula

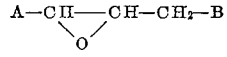

wherein A is selected from the group consisting of hydrogen and $C_{1-30}$ and B is selected from the group consisting of $-R_1$, $-OR_2$,

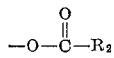

and $-(OR_3)_n$, wherein $R_1$ is $C_{5-18}$ alkyl, $R_2$ is selected from the group consisting of aryl and alkaryl having from 6 to 40 carbon atoms per molecule, cycloalkyl having from 10 to 40 carbon atoms per molecule, and alkyl having from 1 to 18 carbon atoms per molecule, $R_3$ is phenyl having no more than 3 alkyl substituents, said alkyl substituents having no more than 2 carbon atoms per molecule, and $n$ is a whole number from 3 to 8, and (c) from 0.2 to 50 millimoles per liter of said composition of oil-soluble basic substance consisting essentially of at least 0.1 millimole of an organic nitrogen base compound selected from the group consisting of hydrocarbon amines and heterocyclic nitrogen compounds in which a single nitrogen atom is part of a six-membered ring, and at least 0.1 millimole of an inorganic base selected from the group consisting of hydroxides, oxides, and carbonates of Group IIB metals having atomic numbers of from 12 through 56, per liter of said composition.

27. The composition of claim 26 in which the Group IIB metal is zinc.

28. The composition of claim 26 in which the organic nitrogen base is tributylamine and the inorganic base is zinc naphthenate.

References Cited by the Examiner

UNITED STATES PATENTS

| | | | |
|---|---|---|---|
| 2,496,508 | 2/1950 | Watson et al. | 252—407 X |
| 2,554,687 | 5/1951 | Thompson et al. | 252—407 X |
| 2,897,070 | 7/1959 | Newman et al. | 44—63 |
| 2,900,342 | 8/1959 | Manteuffel et al. | 252—57 |
| 2,996,365 | 8/1961 | De Groote et al. | 44—66 X |

DANIEL E. WYMAN, *Primary Examiner.*

C. O. THOMAS, Y. M. HARRIS, *Assistant Examiners.*